United States Patent [19]
Pardubsky

[11] 3,872,596
[45] Mar. 25, 1975

[54] CUTTER PATH SIMULATOR WITH ADJUSTABLE PEN HOLDER

[75] Inventor: James A. Pardubsky, San Diego, Calif.

[73] Assignee: General Dynamics Corporation, San Diego, Calif.

[22] Filed: Sept. 18, 1974

[21] Appl. No.: 507,035

[52] U.S. Cl. ............................................. 33/27 L
[51] Int. Cl. ........................... B43l 9/00, B43l 11/00
[58] Field of Search ....... 33/18 R, 27 R, 27 L, 27 D

[56] References Cited
UNITED STATES PATENTS

| | | | |
|---|---|---|---|
| 1,269,920 | 6/1918 | Foster | 33/27 L |
| 1,542,582 | 6/1925 | Raiche | 33/27 L |
| 2,778,710 | 1/1957 | Komas | 354/139 |
| 2,817,902 | 12/1957 | Allman | 33/27 R |
| 3,002,281 | 10/1961 | Stennes | 33/27 L |
| 3,297,003 | 1/1967 | Benson | 33/18 R |
| 3,330,041 | 7/1967 | Dupler | 33/18 R |

FOREIGN PATENTS OR APPLICATIONS
300,918  9/1917  Germany .......................... 33/27 L Primary Examiner—Harry N. Haroian
Attorney, Agent, or Firm—John R. Duncan

[57] ABSTRACT

A device for simulating the path of a numerically controlled machine tool such as a milling cutter using an X-Y plotter is described. The plotter arm is movable across the plotter table in response to the same program which drives the machine tool. A rotatable drum is mounted on the arm with a pen secured to a pen holder on said drum with the pen supported at a selected offset from the axis of rotation. As the drum rotates and the arm moves, a series of overlapping circles is drawn, reproducing the path cut out by a cutter. The pen holder includes a gear mechanism which provides automatic dynamic counterbalancing for the pen support means in any selected position. The pen support may be easily and accurately set at a selected cutter diameter and easily locked in place.

4 Claims, 4 Drawing Figures

CUTTER PATH SIMULATOR WITH ADJUSTABLE PEN HOLDER

BACKGROUND OF THE INVENTION

Recently, numerically controlled metal working machines have come into widespread use. Typical of such machines are milling machines using continuous-path programming. On such a machine, the cutting tool rotates and cuts material either on the side of the cutter or on the end and side of the cutter simultaneously. The path of the cutter is the projected area over which the end of the cutter moves. The width of this path is dependent upon the diameter of the cutter. The movement of the cutter along this path is controlled by a numerical control program enclosed on a tape (or other storage device) which activates the cutter moving mechanism through a tape reader or the like.

In order to mill a newly designed part on such a machine, a computer programmer prepares a numerical control part program on coding sheets or the like from a part drawing. From this, punched cards or a tape input is prepared, which is processed by a computer which prepares a machine control tape. The computer is required, for example, to develop precise curved paths from the part program which generally provides only the first and last points and sufficient data to identify the curve. The computer calculates sufficient points so that the machine can go from point to point and duplicate the curve with the required tolerance. The information carried by the machine control tape is converted into analog and/or digital signals which actuate the machine drive mechanisms.

There is ample opportunity for error in the preparation of the part program coding sheets, keypunching the punched cards or tape, or in preparation of the computer program. If an error is made, the cutter may be driven incorrectly, ruining the workpiece, and perhaps damaging the cutting tool or milling machine. It would be highly desirable, therefore, to provide a method of checking out the machine control tape prior to initiation of the machining operation.

Conventional X-Y plotters can be adapted to be driven by machine control tapes. Attempts have been made to simulate the cutter path of such a plotter. A rotating means carrying a marking stylus may be mounted on such a plotter to generate a pattern of overlapping circles corresponding to the cutter path. These devices have been largely ineffective, since the stylus used required pressure-sensitive paper to produce a trace, they were not capable of convenient adaptation to simulate a variety of cutter sizes operating at various speeds, and they tended to be inaccurate due to vibration and other factors.

Therefore, there is a continuing need for improved methods and devices for simulating the path of continuously programmed cutters.

SUMMARY OF THE INVENTION

An object of this invention is, therefore, to provide a cutter path simulator which overcomes the above-noted problems.

Another object of this invention is to provide a pen holder mechanism for a cutter path simulator having improved versatility and reliability.

A further object of this invention is to provide a pen holder mechanism for a cutter path simulator capable of convenient and accurate adjustment.

Yet another object of this invention is to provide a dynamically balanced cutter path simulator providing improved accuracy.

The above objects, and others, are accomplished in accordance with this invention in an X-Y numerically controlled plotter by a head, movable in two dimensions, which carries a rotatable drum mounting a pen holder which is rotatable to produce a pattern of overlapping circles of selected diameter and spacing. The plotter is driven by a computer program designed for a numerical control machine tool, such as a milling machine. The path of overlapping circles produced by the plotter is identical with the path of material cut away by the tool cutter. Any errors in the program are readily apparent and can be corrected before the first workpiece is machined, preventing damage to the tool, workpiece, or machine. The pen holder is easily and accurately adjusted to conform to a variety of cutter diameters. The drum rotation speed is adjustable to provide circle spacing appropriate to the plotter head speed. The pen holder is dynamically balanced at all circle diameters to prevent vibration and plotter inaccuracy.

BRIEF DESCRIPTION OF THE DRAWING

Details of the invention and of a preferred embodiment thereof will be further understood upon reference to the drawing, wherein.

DETAILED DESCRIPTION OF THE INVENTION

Figure 1:
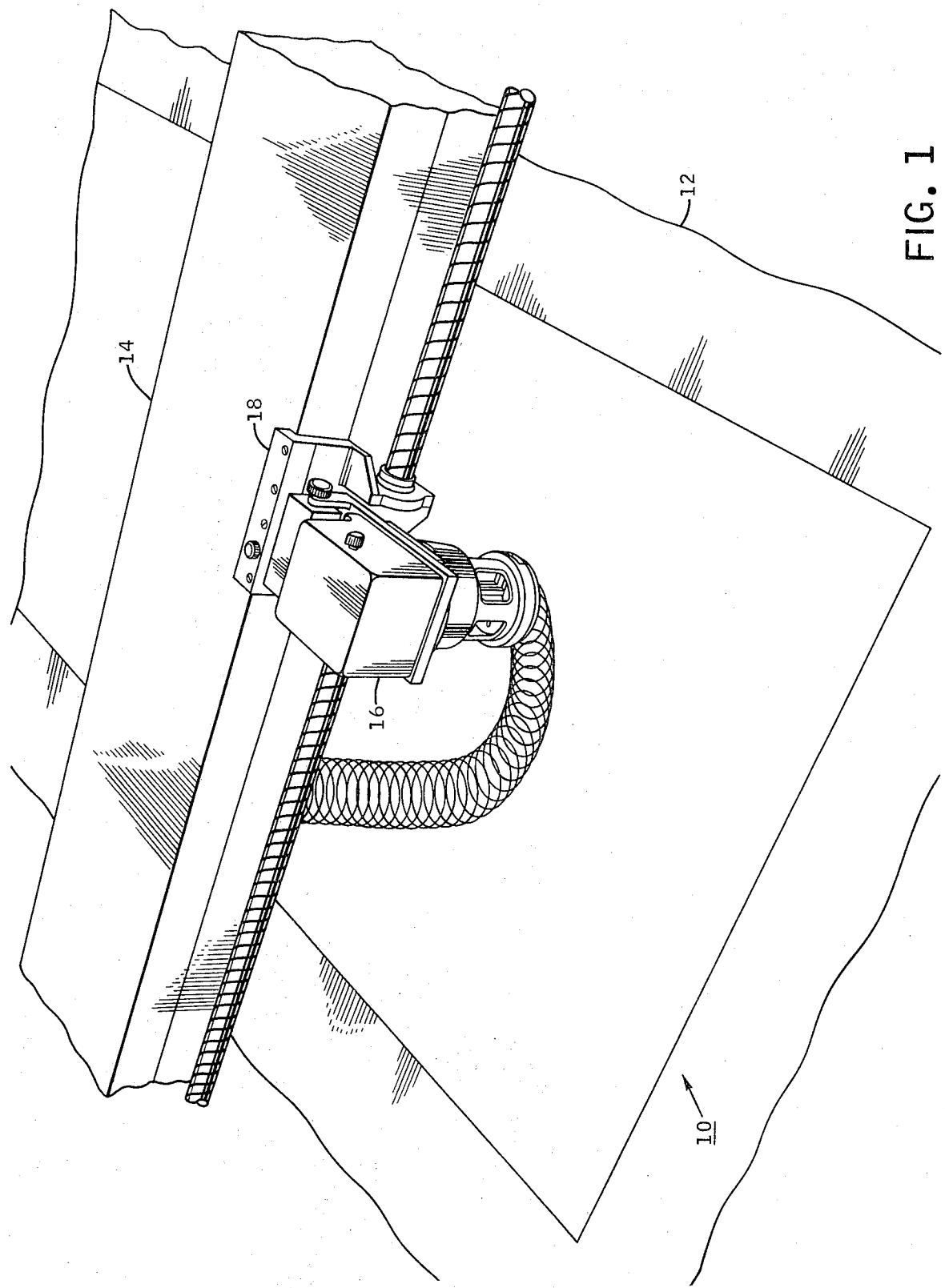
FIG. 1 shows a perspective view of an X-Y plotter adapted to operate as a cutter path simulator.

Referring now to FIG. 1, there is seen a somewhat simplified perspective view of an X-Y plotter 10 using the mechanism of this invention. Plotter 10 includes a bed 12 on which paper 13 or other recording material may be fastened. A carriage 14 is arranged to move back and forth over the bed in one direction. The cutter path simulator of this invention, seen as head 16, is secured to bracket 18 on carriage 14. Bracket 18 is also secured to a lead screw 20 which when rotated causes an engaged nut 19 on bracket 18 to move bracket 18 along the lead screw in a direction perpendicular to the direction of movement of carriage 14. Thus, head 16 can be moved in any direction by bracket 18 and carriage 14 across bed 12. A pen holder described below, rotates an off axis pen in contact with paper 13 as head 16 moves, producing a pattern of overlapping circles 21.

The cutter path simulator of this invention may be used with an suitable X-Y plotter. Typical of such plotters is the Gerber Series 1000 Automatic Drafting Machine, available from the Gerber Scientific Instrument Company.

Figure 2:
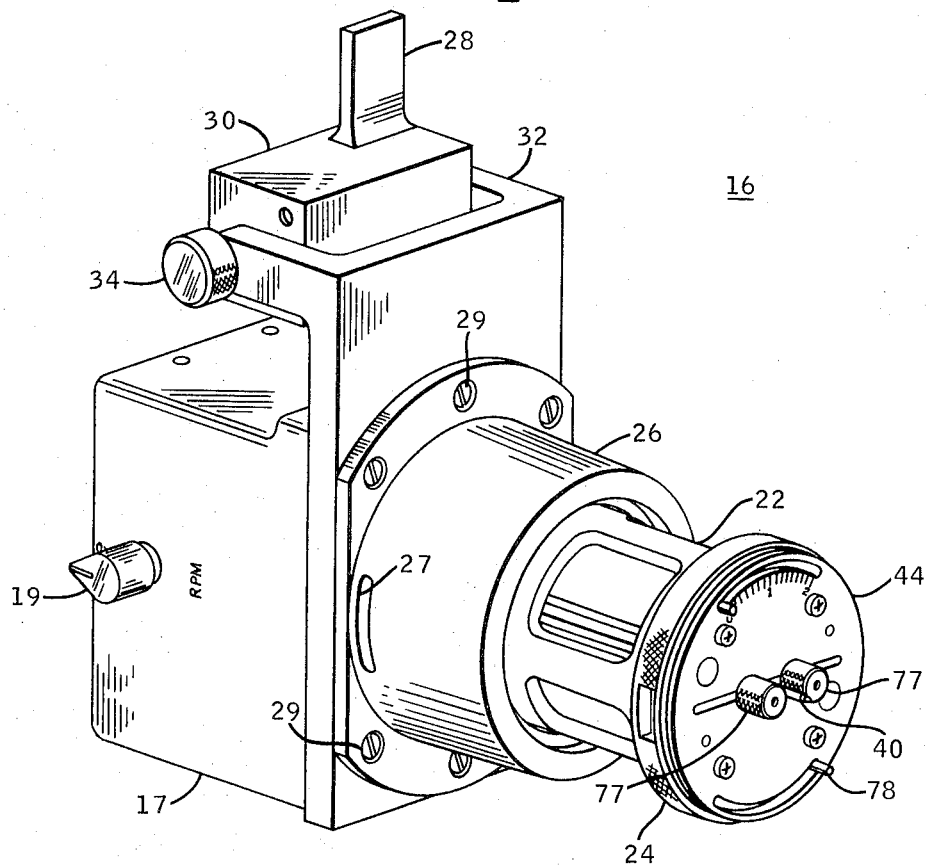
FIG. 2 is a perspective view of the cutter path simulator head, looking upwardly from the plotting surface.

As best seen in FIG. 2, the cutter path simulator consists primarily of head 16 which contains a conventional variable speed motor (not shown) with a downwardly extending output drive shaft, a downwardly extending drum 22 mounted for rotation by the motor relative to head 16 and a pen holder 24 mounted on drum 22 for rotation therewith. A sleeve 26 covers the conventional connection (not shown) between the motor shaft and drum 22. That connection may be, for example, a set-screw extending from drum 22 to a flat on the motor shaft, accessible through slot 27 in sleeve 26, or a threaded connection between male threads on the motor shaft and female threads in the upper end of the drum.

The cutter path simulator may be mounted on the plotter by any means adaptable to the plotter. In the embodiment shown in FIG. 2, a tongue 28 extending from a mounting block 30 enters a slot in bracket 18 and is clamped in place. Head 16 is secured to block 30 by a bracket 32 and threaded locking bolts 34. When bolts 34 are tightened, head 16 is held in the selected position. When bolts 34 are loosened, bracket 32 is pivotable about bolts 34 to swing the mechanism up and out of the way, permitting, for example, convenient changing of paper on bed 12 or adjustment of the pen holder 24.

Figure 3:
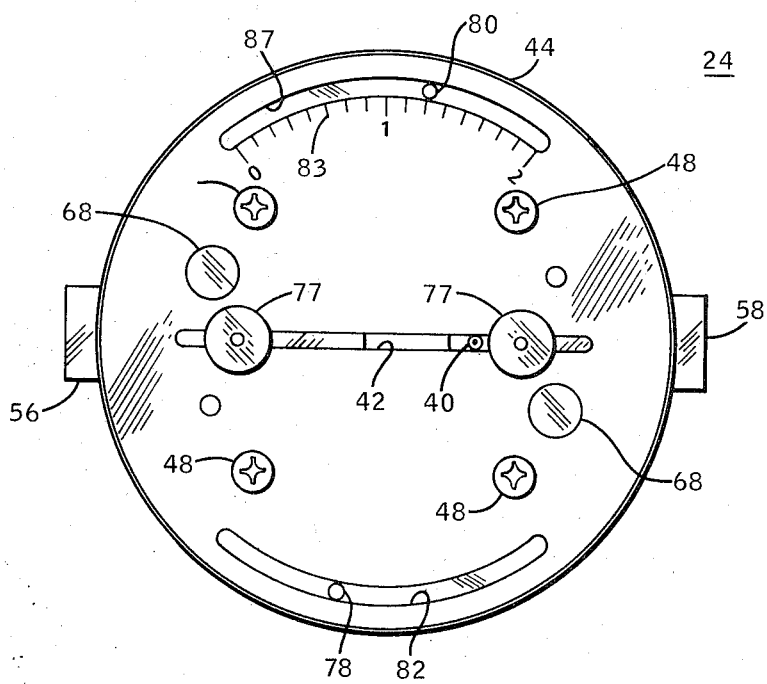
FIG. 3 is a plan view of the face of the cutter path simulator.
Figure 4:
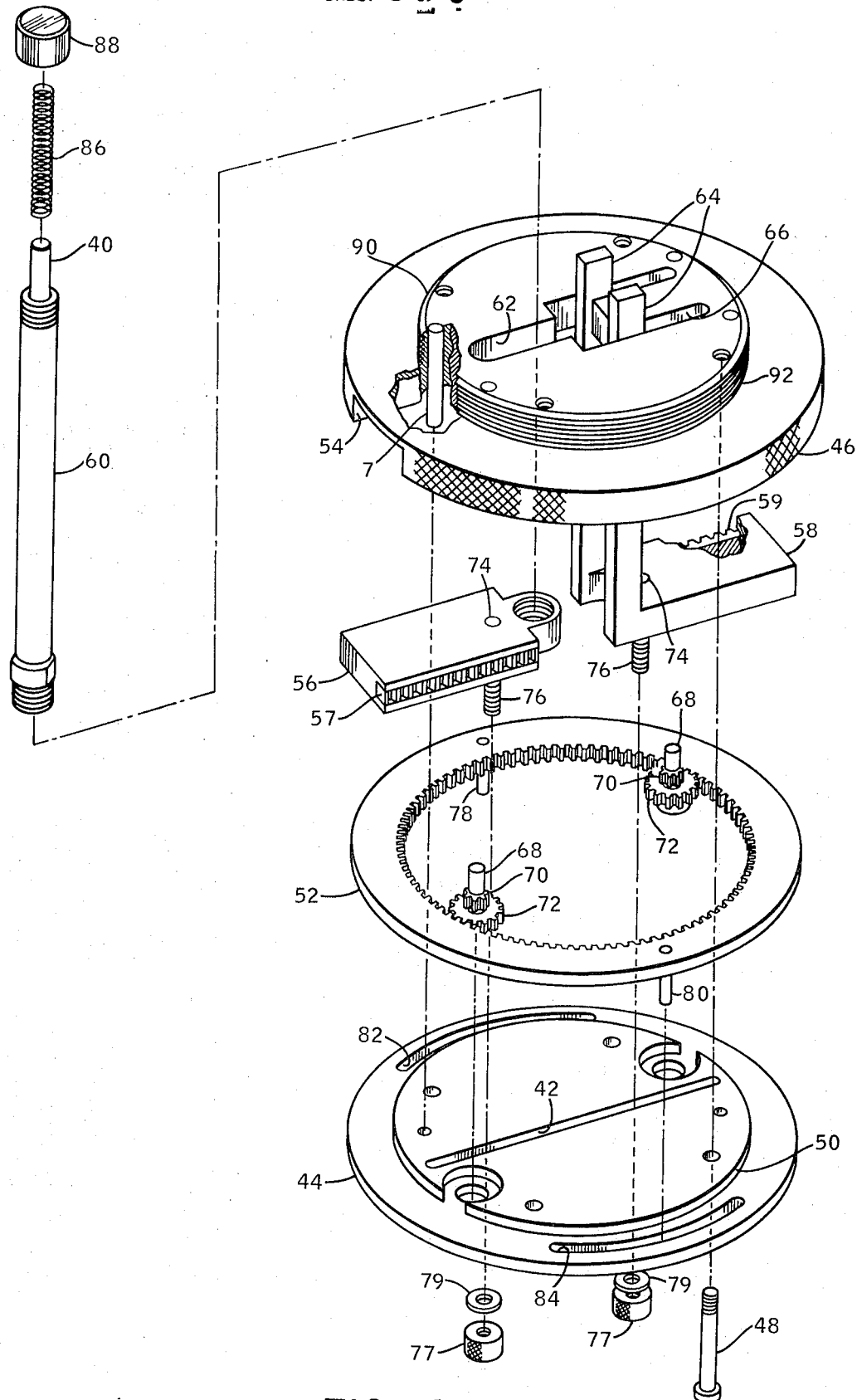
FIG. 4 is an exploded view of the pen holder mechanism.

Details of the components of pen holder 24, and the method of assembly and adjustment of the pen holder, are illustrated in FIGS. 2, 3 and 4.

As seen in FIG. 3, a pen 40, which may be any suitable pen such as a conventional ball point pen refill, is positioned for movement along slot 42 in faceplate 44. As pen 40 is moved further from the rotational axis of faceplate 44 mounted on head 16, the larger the diameter of the circle which is generated.

As best illustrated by FIG. 4, faceplate 44 is secured to base 46 by a plurality of screws 48. Raised shoulder 50 of faceplate 44 is in contact with base 46, leaving a radial space within which internal ring gear 52 is located for rotation relative to faceplate 44 and base 46. The underside of base 46 includes a shallow transverse groove 54 within which two slides 56 and 58 are located for transverse movement relative to base 46. A housing 60 extends upwardly from slide 56 to contain pen 40, which is secured to slide 56 and extends therebelow. Housing 60 extends through slot 62 in the upper portion of base 46. For dynamic balance, a pair of bars 64 mounted on a cutaway base extend upwardly above slide 58 through slots 66 in base 46. Two spaced bars are used to allow the housing 60 and pen 40 to be adjusted to very small circle diameters and to the rotational axis position for line drawing in lieu of circle drawing, and are sized to dynamically balance housing 60 and pen 40.

A pair of pins 71 and 73 extend from base 46 to faceplate 44 to positively and accurately align them and prevent relative movement therebetween.

Each slide 56 and 58 includes a rack gear 57 along one side, engaging pinion gears 68, each of which includes a small gear 70 engaging slides 56 and 58 and a larger gear 72 engaging ring gear 52. Thus, as ring gear 52 is rotated, slides 56 and 58 are moved inwardly or outwardly a proportional distance.

Each of slides 56 and 58 further includes a threaded hole 74 in alignment with slot 42 into which is threaded a stud 76 arranged to receive lock nuts 77 and washers 79. When lock nuts 77 are tightened on studs 76, slides 56 and 58 cannot be moved. These nuts are loosened when it is desired to adjust the circle diameter.

A pair of pins 78 and 80 secured to ring gear 52 extend downwardly therefrom through slots 82 and 84 in faceplate 44. These pins move along the slots when the position of pen 40 is being adjusted. Preferably, a scale 83 showing the distance of pen 40 from the rotational axis of head 16 is marked adjacent to slot 84. While a direct distance scale could be placed adjacent to slot 42 directly indicating the distance of pen 40 from the axis, since pin 80 moves a proportionately greater distance (preferably, 2:1) for a given movement of pen 40, more accurate reading can be obtained from pin 80 and the adjacent scale 83. When lock nuts 77 are loosened, pins 78 and 80 may be grasped with the fingers to manually rotate ring gear 52 and adjust the position of pen 40.

Within housing 60, pen 40 is resiliently biased downwardly by spring 86 and held in place by cap 88.

A central raised area 90 of base 46 includes a peripheral thread 92 which engages a female thread (not shown) within drum 22 for mounting pen holder 24 for rotation with drum 22.

While specific components and arrangements are described in the above description of a preferred embodiment, these may be varied or other components may be used, where suitable, as discussed above. Other applications and ramifications of this invention will occur to those skilled in the art upon reading this disclosure. These are intended to be included in the scope of this invention as defined in the appended claims.

I claim:

1. A cutter path simulator comprising:
    a plotter having an arm movable in two dimensions under numerical control;
    a head adapted to be secured to said arm;
    a variable speed motor within said head to rotate a drum about an axis perpendicular to the plane of said arm movement;
    a pen holder within said drum extending parallel to said axis holding a pen adapted to draw overlapping circles as said drum is rotated and said arm is moved;
    said pen holder including a first and second slide movable toward and away from the drum axis of rotation;
    said first slide including support means for a marking pen;
    said second slide including a member having a mass substantially equal to said support means and pen;
    gear means interconnecting said slides and an indicator means whereby said slides may be simultaneously moved toward and away from said axis and with indicator means indicating the distance between said pen and said axis; and
    locking means for locking said slides with said pen at a selected distance from said axis.

2. The simulator according to claim 1 wherein said gear means comprises an internal ring gear rotatable relative to said pen holder, and pinion gears meshing with said ring gear and rack gears on said slides whereby rotation of said ring gear moves said slides toward or away from said axis of rotation.

3. The simulator according to claim 2 further including at least one pin secured to said ring gear and extending through a radial slot in said pen holder whereby manual movement of said pin about said axis of rotation moves said ring gear and slides to adjust the position of said pen.

4. The simulator according to claim 3 further including a scale secured to said pen holder adjacent to said slot whereby the position of said pin along said slot indicates the position of said pen relative to said axis of rotation.

* * * * *